(12) United States Patent
Hong et al.

(10) Patent No.: US 11,399,120 B1
(45) Date of Patent: Jul. 26, 2022

(54) COMPATIBILITY PROMOTION METHOD, STORAGE MEDIUM, DEVICE AND SYSTEM FOR HDMI

(71) Applicant: Shenzhen Zhishangshixun Technology Co., Ltd., Shenzhen (CN)

(72) Inventors: Shijie Hong, Shenzhen (CN); Yuhua Gu, Shenzhen (CN); Hongjian Zhou, Shenzhen (CN)

(*) Notice: Subject to any disclaimer, the term of this patent is extended or adjusted under 35 U.S.C. 154(b) by 0 days.

(21) Appl. No.: 17/687,647

(22) Filed: Mar. 6, 2022

(30) Foreign Application Priority Data

Mar. 26, 2021 (CN) .......................... 202110327793.8

(51) Int. Cl.
*H04N 7/01* (2006.01)
*H04N 5/04* (2006.01)

(52) U.S. Cl.
CPC .................................. *H04N 5/04* (2013.01)

(58) Field of Classification Search
CPC ............ H04N 5/04; H04N 5/765; H04N 9/80; H04N 7/00; H04N 7/01; H04N 11/00; H04N 5/44
See application file for complete search history.

(56) References Cited

U.S. PATENT DOCUMENTS

| | | | | |
|---|---|---|---|---|
| 8,051,217 B2* | 11/2011 | Goodart | ............... | H04N 5/655 710/33 |
| 9,229,676 B2* | 1/2016 | Han | ................ | H04N 21/426 |
| 9,485,514 B2* | 11/2016 | Labosco | ............. | G09G 5/008 |
| 9,779,687 B2* | 10/2017 | Park | ............... | H04N 5/765 |
| 9,924,129 B2* | 3/2018 | Dickens | ............ | H04N 21/4305 |
| 9,942,512 B2* | 4/2018 | Kim | ................ | H04N 7/0127 |
| 10,547,885 B2* | 1/2020 | Hasek | ............. | H04N 21/23439 |
| 11,082,658 B2* | 8/2021 | Zhao | ................ | H04N 21/4402 |

OTHER PUBLICATIONS

First Examination Report and Search Report of CNIPA.
Notice of Allowance from CNIPA and Allowed Claims.

* cited by examiner

*Primary Examiner* — Trang U Tran

(57) ABSTRACT

Provided is a compatibility promotion method, storage medium, and system for HDMI. The method comprises steps of reading EDID to be analyzed of a display device; defining a situation 1 as the existence of non-standard timing of EDID to be analyzed; defining a situation 2 as the bandwidth of the resolution supported by the display is greater than a maximum bandwidth of a HDMI intermediate device; if the EDID to be analyzed meets the situation 1, after modifying the timing of the EDID to be analyzed into an HDMI standard timing, and then forwarding the modified EDID same to an input source device; if the EDID to be analyzed meets the situation 2, modifying a color depth sampling format and a color format of a resolution greater than a maximum bandwidth of the HDMI intermediate device in the EDID to be analyzed to be within a supported bandwidth range.

10 Claims, 1 Drawing Sheet

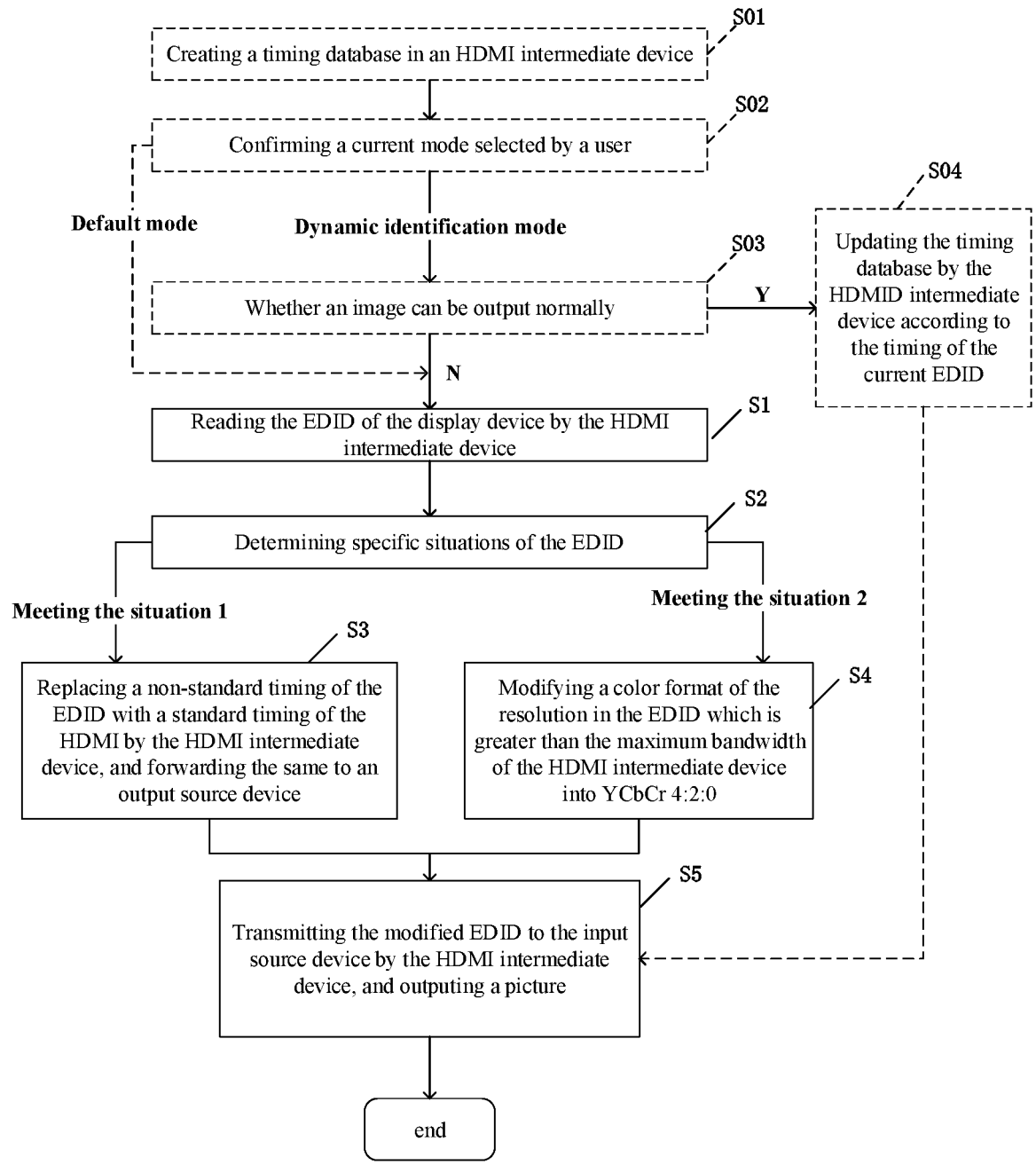

COMPATIBILITY PROMOTION METHOD, STORAGE MEDIUM, DEVICE AND SYSTEM FOR HDMI

CROSS REFERENCE TO RELATED APPLICATIONS

This application claims priority to Chinese Patent Application No. 202110327793.8, filed on Mar. 26, 2021, entitled "Compatibility promotion method, storage medium, device and system for HDMI", which is hereby incorporated by reference.

FIELD OF THE DISCLOSURE

The present invention relates to the technical field of HDMI, and more particularly to a compatibility promotion method, storage medium, device and system for HDMI.

BACKGROUND OF THE DISCLOSURE

HDMI (High Definition Multimedia Interface) is used to send uncompressed audio and video signals, which benefits from transmitting audio and video simultaneously by using only one piece of new material, greatly simplifying the installation of audio and video systems. With the development of society, HDMI has become the most widely used multimedia digital interface with the highest market share.

The HDMI device includes an input source device and a display device-sink device. After the input source device and the display device are connected by the HDMI cable, before outputting images normally, there are following steps.

S1, Hot Plug Detect;

S2, EDID (Extended Display Identification Data) reading and parsing; and the so-called EDID is all information written to the display by a display manufacturer according to the standard for display identification data (i. e. HDMI standard timing) established by the VESA (Video Electronics Standards Association), including the information about the supplier of the display, the maximum image size, color, resolution, refresh rate, etc.

S3, Audio and video transmission, namely, the input source device reads and parses the EDID of the display device via S2, extracts audio and video information required to be output therefrom, and then outputs suitable audio and video to the display device.

With the development of HDMI, a series of HDMI-based intermediate devices, such as HDMI switches, HDMI distributors, HDMI matrices, HDMI extenders, etc. are derived according to various functional requirements in addition to the input source devices and the display devices. Various types of HDMI-based intermediate devices, such as those described above, require reading and analyzing the EDID of the display device and forwarding it to the input source device.

In the prior art, various types of HDMI intermediate devices mainly have the following processing methods for the EDID of the display device.

A. The EDID of the display device is forwarded directly to the input source device without any processing.

This approach has the following drawbacks.

1. If the display device's EDID has a custom HDMI Timing that is not specified by the VESA and the CTA, some input source devices or HDMI intermediate devices cannot correctly resolve such EDID, resulting in an abnormal final output image.

2. If the resolution supported by the display device is greater than the resolution supported by the HDMI intermediate device, the image cannot be output normally after passing through the HDMI intermediate device.

B. The EDID of the display device is directly replaced with the EDID defined by the manufacturer of the intermediate device itself, and this EDID is forwarded to the input source device.

This approach has the following drawbacks.

The HDMI intermediate device directly replaces a default EDID and forwards the same to the input source device. If there is a big difference between the default EDID and the EDID of the display device, the display device will be unable to receive and parse the audio and video information input from the input source device.

It can be seen therefrom that the existing HDMI intermediate device is difficult to be compatible with various types of HDMI devices, with poor compatibility.

SUMMARY OF THE DISCLOSURE

With regard to the defects existing in the prior art, the technical problem to be solved by the present invention is how to be compatible with different models of HDMI devices.

To achieve the above object, the present invention provides a compatibility promotion method for HDMI, comprising the steps of:

S1, reading the EDID of all accessed display devices, taking the EDID of each display device as the EDID to be analyzed, and going to S2;

S2, defining a situation 1 as the existence of non-standard timing of EDID to be analyzed; defining a situation 2 as the bandwidth of the resolution supported by the display device is greater than a maximum bandwidth of an HDMI intermediate device; determining specific situations of each EDID to be analyzed: if the EDID to be analyzed meets the situation 1, it goes to S3; and if the EDID to be analyzed meets the situation 2, it goes to S4;

S3, modifying the timing of the EDID to be analyzed into an HDMI standard timing, and forwarding the modified EDID to an input source device;

S4, acquiring a specified color depth sampling format supported by all the display devices; and after modifying an actual color depth sampling format of all the EDID to be analyzed into the specified color depth sampling format, in all the EDID to be analyzed, modifying the color format with a resolution greater than the maximum bandwidth of the HDMI intermediate device into YCbCr 4:2:0;

S5, transmitting the EDID modified by S3 and/or S4 to the input source device.

On the basis of the above-mentioned technical solution, the specific procedure of S3 comprises acquiring all non-standard DTDs recorded with non-standard parameters in the EDID to be analyzed; determining a standard DTD corresponding to the non-standard DTD in the HDMI standard timing according to Hactive and Vactive described in the information about the non-standard DTD; and modifying the non-standard DTD according to the standard DTD.

On the basis of the above-mentioned technical solution, the specified color depth sampling format in S4 is a highest color depth sampling format supported by all display devices; in all the EDID to be analyzed described in S4, the specific procedure of modifying all the color formats of the resolution greater than the maximum bandwidth of the HDMI intermediate device into YCbCr 4:2:0 comprises:

S401, judging whether the display device corresponding to each EDID to be analyzed supports the color format YCbCr 4:2:0; if so, it goes to S401a; if not, it goes to S401b;

S401a, deleting all the color format information other than YCbCr 4:2:0 which is greater than the maximum bandwidth of the HDMI intermediate device in the EDID to be analyzed; acquiring each resolution in the EDID to be analyzed which is greater than the maximum bandwidth of the HDMI intermediate device, respectively calculating a bandwidth required for transmitting a picture at each resolution in the situation of YCbCr 4:2:0, and defining the bandwidth as the bandwidth to be compared; respectively judging whether each bandwidth to be compared is greater than the maximum bandwidth; if so, deleting the resolution corresponding to the bandwidth to be compared in the EDID to be analyzed; and if not, updating the color format information about the resolution corresponding to the bandwidth to be compared in the EDID to be analyzed;

S401b, acquiring a specified resolution that can be supported by the maximum bandwidth of the HDMI intermediate device and all display devices, and deleting all resolution information other than the specified resolution in each EDID to be analyzed.

On the basis of the above technical solution, the method further comprises the steps of: creating an available timing database before S1, associating the timing of the EDID with a corresponding length-width ratio and resolution after determining the EDID required to be transmitted to the input source device in S5, and saving the same to the available timing database; in S2, before the determining specific situations of each EDID to be analyzed, comparing each EDID to be analyzed with the timing of the EDID in the available timing database:

if the same timing as the EDID to be analyzed exists in the available timing database, defining the EDID as normal EDID and transmitting the same to the input source device;

if there is no timing same to the EDID to be analyzed in the database of available timings, but there is an available timing corresponding to the length-width ratio and resolution of the EDID to be analyzed; and the EDID to be analyzed has a timing replaced with an available timing, then defined as a normal EDID, and transmitted to the input source device;

if the same timing as the EDID to be analyzed does not exist in the available timing database, and there is no available timing corresponding to the length-width ratio and resolution of the EDID to be analyzed, the steps after S2 are continued.

On the basis of the above technical solution, the method further comprises the following steps performed before S1: confirming a current mode selected by a user, wherein, if the current mode is a default mode, it goes to S1; if the current mode is a dynamic identification mode, the EDID to be analyzed of the display device is forwarded to the input source device; and after the input source device outputs an image, the display condition of the display device is determined according to the feedback information from the user; if the display is normal and the timing of the EDID to be analyzed does not exist in the available database, the timing is added to the available database; and if the display is abnormal, it goes to S1.

On the basis of the above-mentioned technical solution, the determination criteria of the situation 1 includes judging whether the timing of each EDID to be analyzed is a standard timing; if so, it does not meet the situation 1; if not, it meets the situation 1; the determination criteria of the situation 2 includes acquiring the bandwidth supported by the resolution of the display device corresponding to each EDID to be analyzed, and judging whether the bandwidth is greater than the maximum bandwidth of the HDMI intermediate device; if so, it meets the situation 2; otherwise, it does not meet the situation 2.

On the basis of the above-mentioned technical solution, the specific procedure of S1 comprises detecting by the display device a 5V pin level change on an HDMI link when the display device, the HDMI intermediate device and the input source device are connected; after raising a HPD pin level and feeding back the HPD signal to the HDMI intermediate device, reading by the HDMI intermediate device the EDID of the display device via a DDC pin of the HDMI link; and the specific procedure of S5 comprises saving the modified EDID separately to a fixed position, lowering down the HPD pin level of the HDMI link at an input end, and actively raising the HPD pin level of the link at the input end after a pre-set waiting duration.

The present invention provides a storage medium having stored thereon a computer program which when executed by a processor implements the above method.

The present invention provides an electronic device comprising a memory and a processor, with the memory having stored thereon a computer program for running on the processor, wherein the processor, when executing the computer program, implements the method described above.

The present invention provides a system for promoting HDMI compatibility comprising a display device, an HDMI intermediate device and an input source device, wherein the display device is used for transmitting EDID to the HDMI intermediate device; the input source device is used for receiving the EDID transmitted by the HDMI intermediate device; and the HDMI intermediate device is used for performing the above method.

The advantages of the present invention over the prior art include the followings.

(1) Compared with a processing method A of causing the final output image to be abnormal due to directly forwarding the EDID in the prior art, it can be seen from reference to S3 that before forwarding the EDID, the present invention modifies the EDID of the display device to a standard timing first, so as to enable the input source device to accurately identify the EDID, thereby ensuring that the output image is normally displayed.

Compared with the processing method A of causing an image without being normally output due to a resolution problem in the prior art, it can be seen from reference to S4 that when the bandwidth of the resolution supported by the display device is greater than the maximum bandwidth of the HDMI intermediate device, the present invention modifies the EDID of the display device and then sends the same to an input source device according to the maximum bandwidth supported by the HDMI intermediate device, so that the input source device can output a picture which is compatible with both the HDMI intermediate device and the display device according to the content described by the processed EDID and has the lowest influence on the display effect.

(2) In S3, the present invention only changes the timing of the EDID. Although the EDID is modified in S4, the modifications are all resolution information complying with the standard, and the rest contents of the EDID remain unchanged. Therefore, the present invention can ensure that the display device correctly receives and parses the audio-video information input from the input source device, as compared with a processing method B in the prior art which reduces the compatibility of the device by directly replacing the default EDID.

It can be seen therefrom that the present invention can be compatible with a plurality of different models of HDMI devices, with good compatibility.

(3) The present invention stores the timing of the EDID of the modified normal display image which is associated with the corresponding length-width ratio and resolution, omitting the process of repeatedly modifying the same EDID timing of a newly accessed display device, thereby improving the working efficiency and enhancing the user experience.

Meanwhile, it can be seen from reference to S01-S04 that the present invention can enable personalized images set by some users to be displayed normally while being compatible with different display devices, thereby further improving the user experience.

BRIEF DESCRIPTION OF DRAWINGS

FIG. 1 is a flowchart of a compatibility promotion method for HDMI in an embodiment of the present invention.

DETAILED DESCRIPTION OF THE DISCLOSURE

Hereinafter, the present invention will be described in further detail with reference to the accompanying drawings and embodiments.

Referring to FIG. 1, a compatibility promotion method for HDMI in an embodiment of the present invention comprises the following steps:

S1, after the display device is accessed, reading the EDID of all the display devices by the HDMI intermediate device, and taking the EDID of each display device as the EDID to be analyzed, turning to S2.

The specific procedure of S1 may be that the display device detects a 5V pin level change on an HDMI link when the display device, the HDMI intermediate device and the input source device are connected; and it feeds back an HPD signal to the HDMI intermediate device by raising the HPD (hot plug detection) pin level; and at this time, the HDMI intermediate device will read the EDID of the display device via the DDC pin of the HDMI link.

S2, defining a situation 1 as the existence of non-standard timing of EDID; wherein the determination criteria for situation 1 includes judging whether the timing of each EDID to be analyzed (the algorithm for analyzing the EDID is an existing mature algorithm, which will not be described in detail herein; for example, a standard timing database can be pre-created; if the timing of the EDID to be analyzed is consistent with the timing in the standard timing database, the timing of the EDID to be analyzed is a standard timing; otherwise, it is a non-standard timing) is a standard timing; if so, it does not meet the situation 1; if not, it indicates that the non-standard DTD (Detailed Timing Descriptor) of H-Blanking, V-Blanking, pixel Clock, etc.) with non-standard parameters (such as H-Total, V-Total, H-Sync and V-Sync) are recorded in the EDID to be analyzed, which corresponds to the situation 1.

A situation 2 is defined as the bandwidth of the resolution supported by the display device is greater than a maximum bandwidth of an HDMI intermediate device; the determination criteria for the situation 2 includes acquiring a bandwidth supported by a resolution (acquired via information such as a horizontal pixel, a vertical pixel and a pixel clock described in the EDID) of a display device corresponding to each EDID to be analyzed, and judging whether the bandwidth is greater than the maximum bandwidth of the HDMI intermediate device (the maximum bandwidth of the HDMI intermediate device is known); if so, it meets the situation 2; otherwise, it does not meet the situation 2.

A situation 3 is defined as a situation where both the situation 1 and the situation 2 are met.

As shown in the solid line part of FIG. 1, the HDMI intermediate device determines the specific situations of each EDID to be analyzed; if the EDID to be analyzed meets the situation 1, it goes to S3; if the EDID to be analyzed meets the situation 2, go to S4; and if the EDID to be analyzed meets the situation 3, S3 and S4 are respectively executed, namely, the execution order of S3 and S4 can be adjusted. Preferably, in order to facilitate execution, the present embodiment responds to the situation 3 by executing S3 first and then S4 (it is convenient to adjust the timing first and then change the EDID information). If the situations 1 and 2 are not met at the same time, it indicates that the display device and the intermediate device can be normally compatible and need not be processed in the manner of the present invention. At this time, it can go directly to S5 (not shown in the drawings).

S3, referring to the solid line part of FIG. 1, after the HDMI intermediate device modifies the timing of the EDID to be analyzed into the HDMI standard timing, the HDMI intermediate device forwards the same to the input source device for solving the compatibility problem described above.

The specific procedure of S3 include acquiring all the non-standard DTDs recorded with non-standard parameters in the EDID to be analyzed; determining a standard DTD corresponding to the non-standard DTD in the HDMI standard timing according to information such as Hactive (active horizontal lines) and Vactive (active vertical lines) and so on described in the information about the non-standard DTD (the determination method can search for backward compatibility); and modifying the non-standard DTD according to the standard DTD, i. e. modifying the non-standard parameters in the non-standard DTD to be the standard parameters in the standard DTD.

S4, the reason why the bandwidth of the resolution supported by the display device according to the applicant's research is greater than the maximum bandwidth of the HDMI intermediate device will be explained first here. Specifically, the maximum bandwidth supported by various types of HDMIs is different. For example, various HDMI display devices supporting a resolution of 4K60 Hz follow the HDMI 2.0 protocol, with its maximum theoretical bandwidth of 18 Gbps; and various HDMI display devices supporting 4K 30 Hz resolution follow the HDMI 1.4 protocol, with its maximum theoretical bandwidth of 10.2 Gpbs. It can be seen that when a display device transmits a 3840*2160@60 Hz (4K60 Hz) 8 bit RGB picture, the bandwidth occupied by the display device is twice as high as the bandwidth occupied by the 3840*2160@30 Hz (4K30 Hz) 8 bit RGB picture (HDMI factors affecting the bandwidth include: horizontal pixel –3840; vertical pixel –2160; refresh rate –60 Hz; color depth –8 bit; and color format-RGB).

For this reason, we need to adapt the high-bandwidth display device required by high resolution to the HDMI intermediate device with insufficient maximum bandwidth by modifying the EDID, as shown in the solid line part of FIG. 1; the main procedure includes that the HDMI intermediate device acquires a specified color depth sampling format supported by all the display devices (for example, 8 bits, 10 bits or 12 bits; in order to improve picture display quality, the specified color depth sampling format is preferably the highest color depth sampling format supported by all the display devices); after all the actual color depth sampling formats of the EDID to be analyzed are modified to the specified color depth sampling format, the color format with a resolution in all the EDID to be analyzed which is greater than the maximum bandwidth of the HDMI intermediate device is modified to be YCbCr 4:2:0.

In S4, the specific procedure of modifying the color format of the resolution in all the EDID to be analyzed which is greater than the maximum bandwidth of HDMI intermediate device into YCbCr 4:2:0 includes:

S401, respectively judging by the HDMI intermediate device whether the display device corresponding to each EDID to be analyzed supports the color format YCbCr 4:2:0; if so, it goes to S401a; if not, it goes to S401b.

S401a:

(1) deleting all the color format information other than YCbCr 4:2:0 which is greater than the maximum bandwidth of the HDMI intermediate device in the EDID to be analyzed;

(2) acquiring each resolution in the EDID to be analyzed which is greater than the maximum bandwidth of the HDMI intermediate device, respectively calculating a bandwidth required for transmitting a picture at each resolution in the situation of YCbCr 4:2:0, and defining the bandwidth as the bandwidth to be compared; respectively judging whether each bandwidth to be compared is greater than the maximum bandwidth:

if so, deleting the YCbCr 4:2:0 color format information, VIC information (video identification code information) and DTD of the resolution corresponding to the bandwidth to be compared in the EDID to be analyzed;

if not, updating the YCbCr 4:2:0 color format information about the resolution corresponding to the bandwidth to be compared in the EDID to be analyzed; the updating means that if the color format information already exists in the EDID, no operation is performed; and if it does not exist (since the color format information of each resolution is generally not stored in the EDID due to storage space, there will be a situation where it does not exist), the color format information is added to the EDID.

It is added that if each bandwidth to be compared is greater than the comparison bandwidth, the display device does not support the color format YCbCr 4:2:0. Therefore, this will not occur in the procedure of S401a supporting the color format YCbCr 4:2:0.

The order of execution of (1) and (2) in S401a may be parallel or sequential; and after both (1) and (2) are completed, it then goes to S5.

S401b, acquiring a specified resolution that can be supported by the maximum bandwidth of the HDMI intermediate device and all the display devices, and deleting all the resolution information other than the specified resolution in each EDID to be analyzed (such as VIC information and DTD, namely, only the specified resolution is reserved), going to S5; wherein the logic of S401b is that if it is not supported, only the resolution information which cannot be transmitted normally can be deleted, so that the subsequent input source device can output a picture with a low definition but normally displayed by all display devices; and the resolution is specified as the highest resolution supported by all display devices in order to improve the picture display quality.

With reference to S401a, it can be seen that the present invention can transmit a picture with a high definition even when the display device supports YCbCr 4:2:0, and can normally transmit a picture with a relatively low definition even when the display device does not support YCbCr 4:2:0. Therefore, the present invention can transmit a picture with an optimal resolution according to the specific situation of the display device, while ensuring that the intermediate device can be compatible with the display device, thereby improving the user experience.

In practical application, since a display device supporting a resolution of 4K50 Hz or 4K59 Hz has a same processing mode as a display device supporting 4K60 Hz, S4 is exemplified below in the situation that the display device supports a resolution of 4K60 Hz and the intermediate device supports only 4K30 Hz.

In this situation, the specific procedure of S4 includes:

after all the actual color depth sampling formats of EDID to be analyzed are modified to 8 bit, judging whether the corresponding display device supports the color format YCbCr 4:2:0;

if so, deleting the description of 3840*2160@60 Hz RGB and YCbCr 4:4:4 in the EDID to be analyzed, and adding the unique description of 3840*2160@60 Hz YCbCr 4:2:0 in the EDID to be analyzed;

if not, deleting the VIC information and DTD for 3840*2160@60 Hz.

Insofar as the above-mentioned procedures of S3 and S4 have been stated, it can be concluded that since both S3 and S4 may modify the EDID to be analyzed to different degrees, in order to ensure the correctness of the modified EDID, the procedure needs to be verified after S3 and/or S4. Specifically, after completion of S3 and/or S4, according to the HDMI standard definition, the relevant position and length description information of the DTD is re-described according to the modification in the EDID to be analyzed; and a check value of the corresponding Block after modification is calculated and written into the last bit of the corresponding Block.

The corresponding Block is understood as that if only S3 or S4 is performed, there is only one Block corresponding to S3 or S4; if S3 and S4 are performed, there are two Blocks respectively corresponding to S3 and S4; the verification procedure can be executed after S3 or S4 and before S5 (namely, performing a verification every modification); and it can also be performed after S3 and S4 and before S5 (namely, performing a verification after all the information has been modified).

S5, referring to the solid line part of FIG. 1, the HDMI intermediate device transmits the modified EDID to the input source device; and at this moment, the input source device can output a picture which is compatible with both the HDMI intermediate device and the display device and has the lowest influence on the display effect according to the content described by the processed EDID. In actual use, S5 may be performed after completion of S3 and/or S4.

The specific procedure of S5 includes saving the modified EDID separately to a fixed position by the HDMI intermediate device, and actively lowering down the HPD pin level of the HDMI link at the input end for a period of time (adjusting specifically according to different situations, usually 108-800 ms); wherein, at this moment, the input source device will determine that the HDMI intermediate device is disconnected from the port thereof; after 108-800 ms, the HDMI intermediate device actively raises the HPD pin level of the input end link; and at this time, the input source device will determine that the HDMI intermediate device is connected again.

Preferably, the above method may further include the following steps.

Before S1, creating an available timing database; and after associating the EDID timing required to be transmitted to the input source device in S5 with the corresponding length-width ratio and resolution (namely, corresponding to the length-width ratio and resolution of the display), saving the same to the available timing database. The creation carrier of the timing database can be a main control single-chip microcomputer chip of the HDMI intermediate device, and can also be an independent storage chip mounted inside the HDMI intermediate device, which is specifically determined according to the situation of the HDMI device.

On this basis, before the HDMI intermediate device determines the specific situation of each EDID to be analyzed in S2, it further includes the step of comparing each EDID to be analyzed with the EDID timing in the available timing database by the HDMI intermediate device:

if the same timing as the EDID to be analyzed exists in the available timing database, it is proved that the EDID can be directly used normally; and at this moment, after the EDID is defined as normal EDID (namely, not being used as the EDID to be analyzed), the EDID is directly transmitted to the input source device;

if there is no timing same to the EDID to be analyzed in the database of available timings, but there is an available timing corresponding to the length-width ratio and resolution of the EDID to be analyzed, it is proved that the available timing meets the parameter requirements of the display device, and can display the image normally; at this moment, the timing of the EDID to be analyzed is replaced with the available timing; and after being defined as normal EDID (namely, not being EDID to be analyzed), it is directly sent to the input source device;

if the same timing as the EDID to be analyzed does not exist in the available timing database, and there is no available timing corresponding to the length-width ratio and resolution of the EDID to be analyzed, the steps after S2 are continued (namely, executing the HDMI intermediate device to determine the specific situation of each EDID to be analyzed).

It can be seen therefrom that the present invention stores the timing of the EDID of the modified normal display image which is associated with the corresponding length-width ratio and resolution, omitting the process of repeatedly modifying the same EDID timing, thereby improving the working efficiency and enhancing the user experience.

Preferably, the present application also obtains the following information at the time of technical development and test.

When the user needs to display the personalized graphic, the EDID timing of the display device is changed, so that the EDID timing that can normally display the graphic, but different from the standard timing of the EDID, occurs.

Therefore, in order to enable compatibility with different display devices while enabling a part of the personalized images set by the user to be displayed normally so as to improve the user experience, with reference to the dotted line part in FIG. 1, the above-mentioned method may further include the following steps performed before S1:

S01, creating a standard timing database in the HDMI intermediate device, and adding the HDMI standard timing to the standard timing database, going to S02. Based on the existence of S01, S2 can judge whether the timing of the EDID to be analyzed is a standard timing by comparing the timing of the EDID to be analyzed with the HDMI standard timing of the standard timing database in S01.

S02, confirming a current mode selected by a user, wherein if the current mode is the default mode, it goes to S1; and if the current mode is the dynamic identification mode, it goes to S03. In this embodiment, the default mode and the dynamic identification mode are pre-set, S01 is a pre-set step before deliver; and S02 is a power-on step of the HDMI intermediate device.

S03, the HDMI intermediate device directly forwards the EDID of the display device to the input source device; after the input source device outputs an image, the display condition of the display device is determined according to the feedback information from the user; if the display is normal, it goes to S04; and if the display is abnormal, it goes to S1.

In S03, a implementation method for determining the display condition of the display device according to the feedback information from the user can be a hardware implementation. For example, a hardware key is provided outside the HDMI intermediate device; and the user clicks once within a specified time to display a normal state and twice to display an abnormal state. It also can be a software implementation. For example, a channel is established between an HDMI intermediate device and a user's PC end or a handheld terminal (a remote controller, a mobile phone, a tablet computer, etc.); and it appoints signals corresponding to normal and abnormal display.

S04, the HDMI intermediate device updates an available timing database according to the timing of the current EDID (namely, displaying a normal EDID in S03); namely, the HDMI intermediate device judges whether the timing of the current EDID already exists in the available timing database; if so, the procedure of the present invention ends; otherwise, the current timing is added to the available timing database.

The purpose of S04 lies in that if a new display device is subsequently accessed, and the user modifies the mode to the default mode, the subsequent modification process is not used when the EDID timing of the new display device is not the standard timing but exists in the available timing database, so as to improve the working efficiency and further optimize the user experience.

Embodiments of the present invention also provide a storage medium (e. g., a USB disk, an optical disk, etc.) having stored thereon a computer program which when executed by a processor implements the above-described compatibility promotion method for HDMI.

An embodiment of the present invention also provides an electronic device (namely, an HDMI intermediate device), including a memory and a processor, with the memory having stored thereon a computer program for running on the processor, wherein the compatibility promotion method for HDMI described above is implemented when the computer program is executed by the processor.

An embodiment of the present invention also provides a system (a computer in the present embodiment) for promoting HDMI compatibility, including a display device (a display in the present embodiment), an HDMI intermediate device (an HDMI switch in the present embodiment) and an input source device (a server in the present embodiment), wherein the display device is connected to the input source device via the HDMI intermediate device. The display device is used for transmitting the EDID to the HDMI intermediate device; the input source device is used for receiving the EDID transmitted by the HDMI intermediate device; and the HDMI intermediate device is used for performing the above-mentioned compatibility promotion method for HDMI.

Further, the present invention is not limited to the above-described embodiments. It will be appreciated by those skilled in the art that some modifications and adaptations may be made without departing from the principle of the invention, and such modifications and alterations are intended to be included within the scope of the invention. What is not described in detail in this description is prior art known to those skilled in the art.

What is claimed is:

1. A compatibility promotion method for HDMI, comprising the steps of:
    S1, reading the EDID of all accessed display devices, taking the EDID of each display device as the EDID to be analyzed, and going to S2;
    S2, defining a situation 1 as the existence of non-standard timing of EDID to be analyzed; defining a situation 2 as the bandwidth of the resolution supported by the display device is greater than a maximum bandwidth of an HDMI intermediate device; determining specific situations of each EDID to be analyzed: when the EDID to be analyzed meets the situation 1, it goes to S3; and when the EDID to be analyzed meets the situation 2, it goes to S4;
    S3, modifying the timing of the EDID to be analyzed into an HDMI standard timing, and then forwarding the modified EDID to an input source device;
    S4, acquiring a specified color depth sampling format supported by all the display devices; and after modifying an actual color depth sampling format of all the EDID to be analyzed into the specified color depth sampling format, in all the EDID to be analyzed, modifying the color format with a resolution greater than the maximum bandwidth of the HDMI intermediate device into YCbCr 4:2:0; and
    S5, transmitting the EDID modified by S3 and/or S4 to the input source device;
    wherein the specified color depth sampling format in S4 is a highest color depth sampling format supported by all display devices; in all the EDID to be analyzed described in S4, the specific procedure of modifying all the color formats of the resolution greater than the maximum bandwidth of the HDMI intermediate device into YCbCr 4:2:0 comprises:
        S401, judging whether the display device corresponding to each EDID to be analyzed supports the color format YCbCr 4:2:0; when so, it goes to S401a; when not, it goes to S401b;
        S401 a: deleting all the color format information other than YCbCr 4:2:0 which is greater than the maximum bandwidth of the HDMI intermediate device in the EDID to be analyzed; acquiring each resolution in the EDID to be analyzed which is greater than the maximum bandwidth of the HDMI intermediate device, respectively calculating a bandwidth required for transmitting a picture at each resolution in the situation of YCbCr 4:2:0, and defining the bandwidth as the bandwidth to be compared; respectively judging whether each bandwidth to be compared is greater than the maximum bandwidth; when so, deleting the resolution corresponding to the bandwidth to be compared in the EDID to be analyzed; and when not, updating the color format information about the resolution corresponding to the bandwidth to be compared in the EDID to be analyzed; and
        S401 b, acquiring a specified resolution that can be supported by the maximum bandwidth of the HDMI intermediate device and all display devices, and deleting all resolution information other than the specified resolution in each EDID to be analyzed.

2. The compatibility promotion method for HDMI according to claim 1, wherein the specific procedure of S3 comprises acquiring all non-standard DTDs recorded with non-standard parameters in the EDID to be analyzed; determining a standard DTD corresponding to the non-standard DTD in the HDMI standard timing according to Hactive and Vactive described in the information about the non-standard DTD; and modifying the non-standard DTD according to the standard DTD.

3. The compatibility promotion method for HDMI according to claim 1, wherein the method further comprises the steps of: creating an available timing database before SI, associating the timing of the EDID with a corresponding length-width ratio and resolution after determining the EDID required to be transmitted to the input source device in S5, and saving the same to the available timing database; in S2, before the determining specific situations of each EDID to be analyzed, comparing each EDID to be analyzed with the timing of the EDID in the available timing database:
    when the same timing as the EDID to be analyzed exists in the available timing database, defining the EDID as normal EDID and transmitting the same to the input source device;
    when there is no timing same to the EDID to be analyzed in the database of available timings, but there is an available timing corresponding to the length-width ratio and resolution of the EDID to be analyzed; and the EDID to be analyzed has a timing replaced with an available timing, then defined as a normal EDID, and transmitted to the input source device;
    when the same timing as the EDID to be analyzed does not exist in the available timing database, and there is no available timing corresponding to the length-width ratio and resolution of the EDID to be analyzed, the steps after S2 are continued.

4. The compatibility promotion method for HDMI according to claim 3, wherein the method further comprises the following steps performed before Si: confirming a current mode selected by a user, wherein, when the current mode is a default mode, it goes to Si; when the current mode is a dynamic identification mode, the EDID to be analyzed of the display device is forwarded to the input source device; and after the input source device outputs an image, the display condition of the display device is determined according to the feedback information from the user; when the display is normal and the timing of the EDID to be analyzed does not exist in the available database, the timing is added to the available database; and when the display is abnormal, it goes to S1.

5. The compatibility promotion method for HDMI according to claim 1, wherein the determination criteria of the situation 1 includes judging whether the timing of each EDID to be analyzed is a standard timing; when so, it does not meet the situation 1; when not, it meets the situation 1; the determination criteria of the situation 2 includes acquiring the bandwidth supported by the resolution of the display device corresponding to each EDID to be analyzed, and judging whether the bandwidth is greater than the maximum bandwidth of the HDMI intermediate device; when so, it meets the situation 2; otherwise, it does not meet the situation 2.

6. The compatibility promotion method for HDMI according to claim 1, wherein the specific procedure of S1 comprises detecting by the display device a 5V pin level change on an HDMI link when the display device, the HDMI intermediate device and the input source device are connected; after raising a HPD pin level and feeding back the HPD signal to the HDMI intermediate device, reading by the HDMI intermediate device the EDID of the display device via a DDC pin of the HDMI link; and the specific procedure of S5 comprises saving the modified EDID separately to a fixed position, lowering down the HPD pin level of the HDMI link at an input end, and actively raising the HPD pin level of the link at the input end after a pre-set waiting duration.

7. The compatibility promotion method for HDMI according to claim 2, wherein the specific procedure of S1 comprises detecting by the display device a 5V pin level change on an HDMI link when the display device, the HDMI intermediate device and the input source device are connected; after raising a HPD pin level and feeding back the HPD signal to the HDMI intermediate device, reading by the HDMI intermediate device the EDID of the display device via a DDC pin of the HDMI link; and the specific procedure of S5 comprises saving the modified EDID separately to a fixed position, lowering down the HPD pin level of the HDMI link at an input end, and actively raising the HPD pin level of the link at the input end after a pre-set waiting duration.

8. The compatibility promotion method for HDMI according to claim 4, wherein the specific procedure of S1 comprises detecting by the display device a 5V pin level change on an HDMI link when the display device, the HDMI intermediate device and the input source device are connected; after raising a HPD pin level and feeding back the HPD signal to the HDMI intermediate device, reading by the HDMI intermediate device the EDID of the display device via a DDC pin of the HDMI link; and the specific procedure of S5 comprises saving the modified EDID separately to a fixed position, lowering down the HPD pin level of the HDMI link at an input end, and actively raising the HPD pin level of the link at the input end after a pre-set waiting duration.

9. The compatibility promotion method for HDMI according to claim 5, wherein the specific procedure of S1 comprises detecting by the display device a 5V pin level change on an HDMI link when the display device, the HDMI intermediate device and the input source device are connected; after raising a HPD pin level and feeding back the HPD signal to the HDMI intermediate device, reading by the HDMI intermediate device the EDID of the display device via a DDC pin of the HDMI link; and the specific procedure of S5 comprises saving the modified EDID separately to a fixed position, lowering down the HPD pin level of the HDMI link at an input end, and actively raising the HPD pin level of the link at the input end after a pre-set waiting duration.

10. A system for promoting HDMI compatibility comprising a display device, an HDMI intermediate device and an input source device, wherein the display device is used for transmitting EDID to the HDMI intermediate device, and the input source device is used for receiving the EDID transmitted by the HDMI intermediate device, characterized in that the HDMI intermediate device is used for performing the method of claim 1.

\* \* \* \* \*